Patented Nov. 14, 1950

2,530,349

UNITED STATES PATENT OFFICE 2,530,349

CYAN COLOR FORMERS CAPABLE OF YIELDING FINE GRAIN IMAGES

Winfred C. Craig, Westfield, N. J., assignor to General Aniline & Film Corporation, New York, N. Y., a corporation of Delaware No Drawing. Application April 30, 1947,
Serial No. 745,113

5 Claims. (Cl. 95—6)

The present invention relates to cyan color formers and more particularly to such color formers which upon color forming development are capable of yielding quinoneimine dyes of excellent spectral properties and exceedingly fine grain.

In USP 2,373,821 there is disclosed cyan color formers comprising an aromatic hydroxy compound containing in its molecule a 5-membered heterocyclic nucleus, such as, a benzothiazole, benzoxazole or benzimidazole. Specific reference is made in the patent to the preparation of 2-(2'-(1'-hydroxy) naphthyl) benzimidazole by heating the condensation product from 1-hydroxy-2-naphthoic acid and O-phenylenediamine to split off water.

The patentee points out that the color formers disclosed therein are particularly characterized by the fact that the dyestuffs obtained therefrom exhibit an especially high absorption in the short wave infra-red, making the color formers eminently suitable for use in the negative-positive process. The patentee also asserts that owing to the high absorption in the long wave red of the quinoneimine dyestuffs produced from the color formers, the color formers are also utilizable in the formation of sound records.

While the color formers described in the patent possess the properties attributable thereto by the patentee, they nevertheless suffer from the very serious disadvantage that the dyestuff images which they yield upon color forming development are of relatively coarse grain. For this reason, such color formers have little or no utility in color film of small size, particularly 8 mm. film which for proper reproduction requires fine grained images, particularly as regards the cyan or key image.

I have now discovered a class of cyan color formers which comprises a hydroxy aromatic radical, the carbon atom in ortho-position to said hydroxyl group being directly linked to the carbon atom in the 2-position of a benzimidazole nucleus, said benzimidazole nucleus being substituted on the nitrogen atom in the 1-position by a long aliphatic chain and in the fused-on benzo radical by a water solubilizing group. It has been ascertained that compounds so constituted, when employed as color formers in photographic emulsions, not only possess the properties of the color formers described in the above mentioned patent but also have the additional very desirable characteristics of yielding cyan dye images on color development which have excellent spectral properties and an exceedingly fine grain. For this reason, the compounds are particularly adapted for utilization in the red sensitive layer of small film such as, 8 mm. film which requires exceedingly fine grained images in the cyan or key image layer. Furthermore, because of the presence in the compounds of the long aliphatic chain and the solubilizing substituent the compounds are readily dispersed in photographic emulsions and are non-migratory once they have been incorporated therein. Said color formers, their use in photographic emulsions and the processing of such emulsions to cyan dye images, constitute the purposes and objects of the present invention.

The color formers contemplated herein are depicted by the following structural formula:

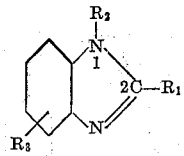

wherein $R_1$ is a hydroxy aromatic radical, the hydroxy group being directly linked to a nuclear carbon atom, such as, hydroxy naphthyl, hydroxy phenyl and the like and such radicals substituted by halogen, i. e., chlorine, bromine and the like, sulfo, carboxy, lower alkyl, i. e., alkyl containing up to five carbon atoms, such as, methyl, ethyl, propyl, butyl and amyl, and lower alkoxy, the alkyl radical of which is as above, $R_2$ is a long aliphatic chain containing at least ten carbon atoms, such as, decyl, lauryl, oleyl, octadecyl and the like and $R_3$ is a water solubilizing group, such as, sulfo, carboxy, hydroxy, hydroxy poly-ethenoxy ether radical and the like.

The new class of color formers is obtained by two reactions, the first involving the condensation of a 1-hydroxy-2-aroyl chloride with an ortho-phenylenediamine of the following formula:

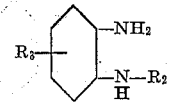

wherein $R_2$ and $R_3$ have the values given above with the elimination of hydrogen chloride, and the second involving the ring closure of the condensation product with elimination of water. The condensation reaction is generally effected by heating the components in an inert diluent, such as, benzene, toluene or the like to a temperature ranging from about 75 to 150° C. in the presence of an acid binding agent, such as, pyridine, α-picoline, quinoline and the like. The ring closure reaction is generally effected by heating the condensation product to a temperature ranging from about 100 to 135° C. in the presence of a water binding agent, such as, acetic anhydride, glacial acetic acid and the like. The product resulting from ring closure after isolation from the reaction mixture may be purified by dissolving it in a hot mixture of benzene and alcohol and recrystallizing the product from such solution.

The following are illustrative of color formers embraced by the above class:

(1) 1 - octadecyl-2-(2'-(1'-hydroxy) naphthyl) benzimidazole-5-sulfonic acid.

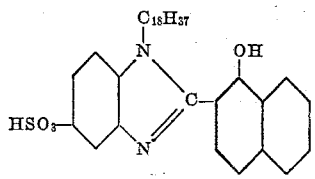

(2) 1-octadecyl-2-(2'-(1'-hydroxy - 4' - chloro) naphthyl) benzimidazole-5-sulfonic acid.

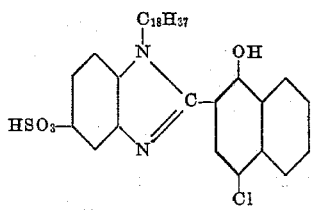

(3) 1-octadecyl-2-(2'-(1'-hydroxy - 4' - sulfo) naphthyl) benzimidazole-5-sulfonic acid.

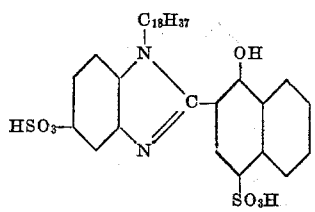

(4) 1-oleyl - 2 - (2' - (1' - hydroxy) naphthyl) benzimidazole-5-sulfonic acid.

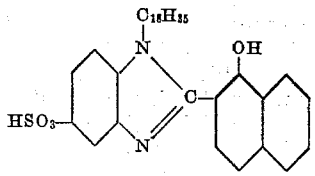

(5) 1-oleyl - 2 - (2'-(1' - hydroxy - 4' - chloro) naphthyl) benzimidazole-5-sulfonic acid.

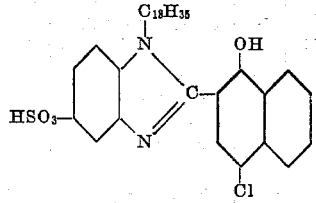

(6) 1-octadecyl-2-(2'-(1'-hydroxy-6'-methyl) phenyl) benzimidazole-5-sulfonic acid.

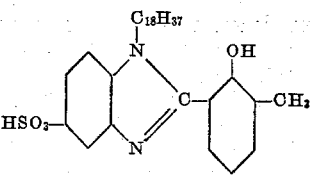

(7) 1-lauryl - 2(2' - (1' - hydroxy) naphthyl)- benzimidazole-5-sulfonic acid.

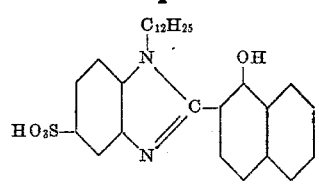

(8) 1-octadecyl-2(2'-(1'-hydroxy-6'-methoxy) phenyl) benzimidazole-5-sulfonic acid.

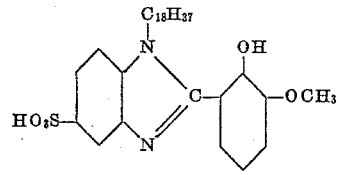

(9) 1-oleyl - 2 - (2' - (1' - hydroxy) naphthyl) benzimidazole-5-carboxylic acid.

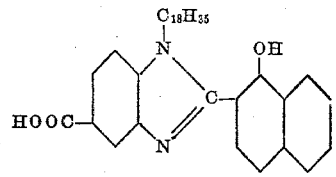

The color formers are incorporated in photographic emulsions in the customary manner as by dissolving them in water or aqueous alkaline solutions and adding the solution to a gelatino silver halide emulsion. The emulsions may be utilized for the production of colored negatives, reverse positives or in the negative positive process.

The following examples serve to further illustrate the invention but it is to be understood that the invention is not restricted thereto. The parts are by weight unless otherwise stated.

*Example 1*

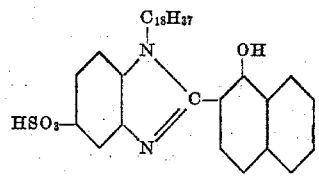

50 parts of 3-amino-4-octadecylaminobenzene-sulfonic acid are suspended in
500 parts of benzene containing
30 parts of pyridine. After distilling off 100 parts of benzene to remove water, there are added at 65–70° C.
30 parts of 1-hydroxy-2-naphthoyl chloride.

The benzene is removed by distillation at 80° C. to 100° C. over a period of 1 hour. The reaction mixture is heated from 100° C. to 130° C. over a period of 1 hour, and maintained at 130–135° C. for 2 hours. To the residue is added at 120° C.
250 parts of glacial acetic acid. After heating at 115–120° C. for ½ hour and cooling below 80° C., there are added
150 parts ethanol or methanol. The mixture is cooled to 20° C. and agitated for 2 to 5 hours. After chilling at 0–5° C. for 1 hour, the crude product is collected on a filter, washed with
200 parts of ethanol, sucked dry, then air dried.

The crude product is recrystallized, by dissolving it in a refluxing mixture of
350 parts of benzene, and
150 parts of ethanol. The solution is filtered while hot to remove any insoluble material.

The filtrate is cooled to 20° C., agitated for ½ hour and then chilled at 15° C. for ½ hour. The crystalline product is collected on a filter, washed with 125 parts of ethanol, sucked dry and then air dried.

.5 gram of the resulting color former is added to 100 cc. of a photographic silver bromide emulsion. The emulsion is coated on a transparent support and dried. After exposure, the film is developed in a color forming developer comprising water, 1000 parts of sodium sulfite,
15 parts of p-diethylamino aniline,
2.5 parts of sodium carbonate and
70 parts of potassium bromide.

A silver + dye image is formed. After removal of the silver by bleaching in a potassium ferrocyanide solution and subsequent fixing, a deeply colored greenish blue dye image remains, said dye image being characterized by an exceedingly fine grain.

*Example 2*

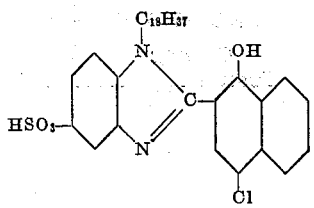

This product is prepared by the same method used in Example 1 but from 50 parts of 3-amino-4-octadecylaminobenzene-sulfonic acid,
500 parts of benzene,
30 parts of pyridine, and
42 parts of 1-hydroxy-4-chloro-2-naphthoyl chloride.

When this color former is incorporated in a photographic silver halide emulsion, the emulsion coated on a support and exposed, developed and processed as in Example 1, beautiful cyan dye images of exceedingly fine grain are obtained.

*Example 3*

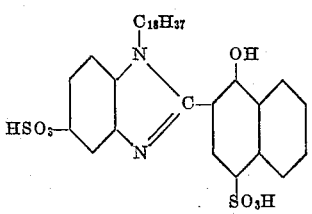

To 250 parts of sulfuric acid (100%) at 10° C. are added portionwise 50 parts of 1-octadecyl-2-(2'-(1'-hydroxy) naphthyl) benzimidazole-5-sulfonic acid.

The reaction mixture is agitated at 10–15° C. for 1 hour, then warmed to 20–25° C. and agitated until sulfonation is complete. After drowning in 2000 parts of ice with agitation, there are added
1000 parts of water, and
300 parts of potassium chloride. The crude product is collected on a filter, washed with 10% KCl solution, and dried.

The product is purified by recrystallization from 500 parts of methanol.

This color former when used in photographic silver halide emulsions likewise yields cyan dye images of excellent spectral properties and exceedingly fine grain.

*Example 4*

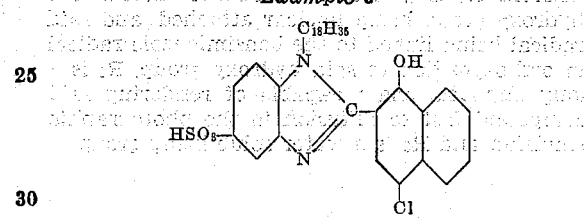

This product is prepared in the same manner as that of Example 1 but from 45 parts of 3-amino-4-oleylaminobenzenesulfonic acid,
300 parts of pyridine,
110 parts of benzene, and
40 parts of 1-(carbethoxy-hydroxy)-2-naphthoyl chloride.

This color former gives on color forming development with the developer of Example 1 cyan dye images of exceedingly fine grain.

*Example 5*

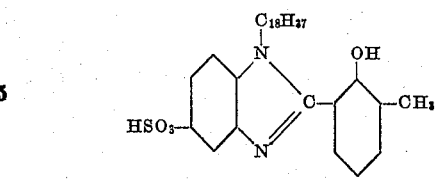

This product is prepared in the same manner as that of Example 1 but from 50 parts of 3-amino-4-oleylaminobenzenesulfonic acid,
350 parts of pyridine,
100 parts of benzene, and
35 parts of 1-hydroxy-4-chloro-2-naphthoyl chloride.

*Example 6*

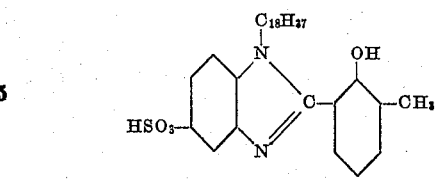

This product is prepared in the same manner as that of Example 1 but from 44 parts of 3-amino-4-octadecylaminobenzene-sulfonic acid,
450 parts of benzene,
25 parts of pyridine, and
30 parts of beta-cresotinoyl chloride.

Color formers of Examples 5 and 6 likewise yield on development with the developer of Example 1 cyan dye images of exceedingly fine grain and excellent spectral properties.

I claim:

1. A photographic silver halide emulsion containing as a color former for the cyan the compounds of the following formula:

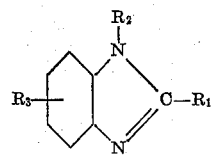

wherein $R_1$ is a hydroxy aromatic radical, the hydroxy group being nuclear attached, and said radical being linked to the benzimidazole radical in ortho-position to said hydroxy group, $R_2$ is a long aliphatic chain capable of rendering said compound fast to diffusion in the photographic emulsion and R₃ is a water solubilizing group.

2. A photographic silver halide emulsion containing as a color former for the cyan image the compound 1-octadecyl-2-(2'-(1'-hydroxy) naphthyl) benzimidazole-5-sulfonic acid.

3. The process of producing cyan dye images of exceedingly fine grain in a photographic silver halide emulsion which comprises exposing said emulsion and developing the same with a developer of p-phenylenediamine type in the presence of a color former having the following formula:

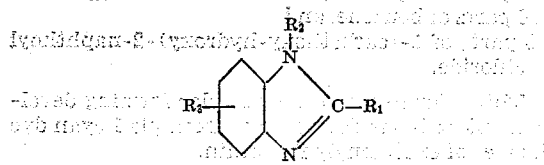

wherein R₁ is a hydroxy aromatic radical, the hydroxy group being nuclear attached, and said radical being linked to the benzimidazole radical in ortho-position to said hydroxy group, R₂ is a long aliphatic chain capable of rendering said compound fast to diffusion in the photographic emulsion and R₃ is a water solubilizing group.

4. The process as defined in claim 3 wherein said color former is located in the emulsion.

5. The process of producing cyan dye images of exceedingly fine grain which comprises exposing a photographic silver halide emulsion containing as a color former the compound 1-octadecyl-2-(2'-(1'-hydroxy) naphthyl) benzimidazole-5-sulfonic acid and developing the exposed emulsion with a developer of the p-phenylenediamine type.

WINFRED C. CRAIG.

REFERENCES CITED

The following references are of record in the file of this patent:

UNITED STATES PATENTS

| Number | Name | Date |
|---|---|---|
| 2,186,849 | Wilmanns et al. | Jan. 9, 1940 |
| 2,353,754 | Peterson | July 18, 1944 |
| 2,357,394 | Frohlich et al. | Sept. 5, 1944 |
| 2,373,821 | Frohlich | Apr. 17, 1945 |
| 2,410,620 | Allen | Nov. 5, 1946 |

FOREIGN PATENTS

| Number | Country | Date |
|---|---|---|
| 836,144 | France | Oct. 10, 1938 |